Patented Nov. 7, 1950

2,529,322

UNITED STATES PATENT OFFICE 2,529,322

PROCESS OF PREPARING SYNTHETIC DRYING OILS

John C. Zimmer, Union, and Jeffrey H. Bartlett, Westfield, N. J., assignors to Standard Oil Development Company, a corporation of Delaware No Drawing. Application August 20, 1947, Serial No. 769,770

7 Claims. (Cl. 260—410.7)

This invention relates to drying compositions and related materials and also to a process for preparing such materials. More specifically, it relates to the preparation from petroleum derivatives of a new type of drying compositions which are suitable for use in paints, varnishes, printing inks, and the like. The materials prepared according to this invention are useful also for other and related purposes. For example, these products may be employed as modifiers for plastics, for natural and synthetic rubber, in caulking compounds, adhesives, factices, and other analogous materials.

In the prior art various proposals have been made for the use of unsaturated materials derived from petroleum as substitutes for the relatively costly drying oils, such as linseed oil, tung oil, and the like, which have long been used in paint, varnish, linoleum, and other products. Generally speaking, however, these petroleum derivatives have not been entirely satisfactory although they have been used to a considerable extent. Among the petroleum derivatives which have been proposed for use as drying oils and the like are some of the olefinic and diolefinic polymers, for example those having a molecular weight range between 200 and 1000. Various studies conducted in recent years have indicated that gasoline produced by steam cracking of gas oil, etc., has an increased tendency toward gum formation due apparently to a relatively high content of dienes and particularly of conjugated diolefins. It was found that by treating such gasolines in the vapor phase with fresh clay a product of satisfactory gum stability could be obtained, or at least a gasoline which could be satisfactorily stabilized by the use of a small quantity of known antioxidant. As a by-product of this process there resulted a polymer of high iodine number and high diene number which appeared to have promise for use as a drying oil.

As indicated above polymers of high diene content were suggested for use in paints, varnishes, etc., to replace tung oil, linseed oil, and the like, but in use it was found that these polymers tend to dry or polymerize excessively and therefore to become hard, brittle, non-flexible resins. When applied in coating compositions these resinous materials become so hard and brittle that they readily chip, crack, craze, or otherwise become broken in texture and they separate to an objectionable degree from surfaces which are subject to flexing as in the case of coated sheet metals, linoleums, and the like. As a result of these characteristics, paints and other protective compositions employing particular resins have been found to have poor weather qualities and their resistance to abrasion has been found to be unsatisfactory.

We have discovered, however, that resins of the general type just described, for example those polymers having a molecular weight between 200 and about 1000, such as are obtained by the clay treatment of gasolines high in diolefin content, may be further treated to improve their properties for use as drying oils. Such resins may be reacted with certain organic acids or acidogenic compounds and thereafter esterified with a suitable alcohol to produce a drying oil of superior quality. Resins produced and modified in this manner are suitable not only for use in paints and coating compositions generally but may be used also in adhesives, plastics, caulking compounds, and in various other products where linseed oil and tung oil and the like have been used in the past. They are suitable for use in linoleum, pressboard, plywood, oilcloth, and other materials where flexibility becomes an important consideration.

It is therefore an important object of our invention to modify olefinic and diolefinic polymers of the general character described above to substantially improve their normally hard and brittle characteristics so that upon drying they will produce tough, flexible films and compositions. A further object of our invention is to incorporate into olefinic and diolefinic polymers derived from petroleum certain constituents containing carboxyl groups to improve the properties referred to above.

Specifically, we have found that polymers derived by the clay treatment of hydrocarbons as described above may be suitably modified for our purposes by reacting them with alpha-beta unsaturated acids or anhydrides, or with other alpha-beta unsaturated acidogenic materials. Thus petroleum resins of the character described above may be reacted with nitriles which will yield acids on hydrolysis, one example of such a nitrile being acrylonitrile.

Olefinic and diolefinic polymers may be reacted with acrylic acid, methacrylic acid, maleic acid, sorbic acid, citraconic acid, itaconic acid, and the like. The corresponding anhydrides, especially maleic anhydride and chlormaleic anhydride are considered particularly suitable.

It is known that maleic anhydrides will react with conjugated diolefins according to the Diels-Alder reaction. Maleic anhydrides will also react with monoolefins to yield substituted succinic anhydrides, these products having been described in the prior art.

In U. S. Patent No. 2,342,113, to Blair, there is shown the use of the latter reaction with unsaturated acids, for example. It appears that other acids and anhydrides are useful, particularly those having alpha-beta unsaturation.

As a specific example of our invention, a petroleum fraction such as gas oil or heavy naphtha, is cracked at a relatively low pressure such as 10 to 50, for example, 30 pounds per square inch gage, at a temperature in the range 1200° to 1350° F., for example 1250° F., in the presence of a substantial amount of steam, for example 75 mol per cent steam based on the oil feed. The products from the steam cracking operation are subjected to clay treatment in vapor and/or liquid phase and at a temperature of at least 250° to as much as 500° F. From this treatment there results a polymer oil which, as suggested above, has a molecular weight of 200 to about 1000. In this process the total steam cracked hydrocarbon may be treated or only various fractions thereof as may be desired. At present, however, we prefer to use the fraction boiling below 430° F. The unsaturated hydrocarbons boiling below about 100° F. are particularly valuable for other chemical processes and therefore it is preferred to subject the fraction boiling between about 100° and 430° F. to the clay treatment.

The products of the clay treatment, it will be understood, include both low boiling and high boiling fractions. Some saturated hydrocarbons are included in the low boiling fraction for these are carried along without entering into the polymerization reaction. In general, the low boiling fraction, that is the fraction which is not polymerized or partially polymerized and which boils up to about 430° F., is removed and used for gasoline. Gasoline so produced is quite free from a tendency toward gum formation. If desired, a small amount of the conventional gum inhibitor may be used to further improve this quality.

The fraction boiling above 430° F. is the polymer oil mentioned above which is the starting material for the preparation of our improved product. This product appears to consist of polymers and copolymers of mono- and diolefins of both cyclic and non-cyclic structure. Polymers or alkylates of aromatic compounds with olefins and/or diolefins of cyclic and non-cyclic character may be present also. The polymers so produced have the following typical properties:

| | |
|---|---|
| Gravity API | 13.9 |
| Viscosity at 100° F. S. S. U. | 1266 |
| Viscosity at 210° F. S. S. U. | 66.4 |
| Diene No. | 21.1 |
| Iodine No. | 207.4 |
| Distillation: | |
|    Initial boiling point °F | 420 |
|    20% °F | 538 |
|    40% °F | 595 |

Polymers produced as above are next reacted with an unsaturated acid, acid anhydride or acidogenic material as described above. Specifically, the polymer may be reacted with maleic anhydride to form directly a carboxylated product.

The carboxylated product obtained as described above is next esterified with a suitable alcohol and this esterification is an important aspect of the present invention. Either a mono- or a polyhydroxy alcohol may be used for this purpose. The mono-hydroxy alcohols may have chain lengths in the $C_2$–$C_{20}$ range, and may be primary alcohols such as those derived by the hydrogenation of cocoanut oil acids, or from the addition of olefins as in the oxo process. It is not necessary that the alcohols be separated into narrow fractions, and mixtures of alcohols, for example, $C_{10}$–$C_{18}$ inclusive, may be employed. Esterification may be carried out at various temperatures but a temperature range of 100° to 200° C., preferably about 160° C. (320° F.) is preferred. Secondary mono-hydroxy alcohols are also suitable, for example 2-ethylhexyl alcohol. As regards polyhydroxy alcohols, the $C_2$ and $C_3$ glycols and glycerine are suitable for use in the esterification step. The resulting ester is a drying or polymerizable oil having the superior properties referred to hereinabove. A good drying oil has a high degree of flexibility even when fully dried, good adhesion, good weathering qualities and good moisture resistance. It dries hard but is free of brittleness, is not subject to discoloration, does not crack or craze, and is preferably highly resistant to soaps, greases, caustics, acids and the like.

As a specific illustrative example of the invention a 1700 g. portion of a petroleum resin polymer of the type described above was blown with dry nitrogen at 130° to 140° C. to remove any moisture that might be present. 168 g. of maleic anhydride was then added and the mixture was maintained at a temperature of 175 to 180° C. for approximately 36 hours with stirring. The resulting product was then topped under reduced pressure (185° C. at 23 mm.) to remove the unreacted maleic anhydride and the more volatile constituents of the product. Only a trace of maleic anhydride and about 64 grams of light ends were distilled over. The saponification number of the residual alkylated maleic anhydride was 83.4.

A portion of the above anhydride (1296 g.) was next esterified with 65 g. of glycerine in the presence of 10 g. of toluene sulfonic acid as a catalyst. The esterification was carried out by stirring the reaction mixture for 12 hours at 160° C. under 30 mm. pressure. The water resulting from the esterification was distilled off during the course of the reaction. The finished ester was a hard solid at room temperature. The original polymer the anhydride, and the final ester product were evaluated for resistance to moisture condensation and flexing. 50% solutions by weight were made by dissolving each of the three materials respectively in a hydrocarbon solvent of the paint and varnish thinner type (Varsol). The solutions thus prepared were applied to polished steel plates 2" x 4" x 1/16" by dipping and the films were allowed to dry 24 hours at room temperature. These panels were then subjected to conditions of 100° F. temperature and 100% humidity (heavy moisture condensation) for 72 hours. At the end of the test period the appearance of the coatings was noted.

Similarly coated panels, after drying, were inserted in a vise and bent through an angle of 120° to determine resistance of the coating to fracture caused by flexing. The results are tabulated below.

*Table I*

| | Petroleum Resin Polymer | Polymer-Maleic Anhydride Condensate | Anhydride Glycerine Ester |
|---|---|---|---|
| Humidity Cabinet—72 hours | Coating very white. Large amounts of rust. | Coating white. Some rust. | No discoloration or rust. |
| 120° Flexing | Severe film fracture. | Some film fracture. | No film fracture. |

The above data indicate that esterification of the petroleum resin-maleic anhydride condensation product very considerably improves its usefulness as a component of protective coatings. The product appears to be especially useful as a replacement for drying oil in paints and varnishes.

It will be understood that although catalysts may be employed, and a specific catalyst was used in the esterification step in the foregoing example, the reactions in general may not require a catalyst. The reaction temperature should be above 100° C. (212° F.) and obviously may be varied. The temperature range is usually below about 250° C. (482° F.) the range of about 140° to about 200° C. being preferred for condensation of the resin with maleic anhydride and generally similar temperature ranges for reaction with other acids and nitriles. The temperature for esterification likewise may vary, depending upon the materials used and the catalyst, if any. In general, as indicated above, esterification is carried out at a somewhat elevated temperature, for example 100° to 200° C., and preferably at reduced pressure.

Our unsaturated polymers, derived from petroleum hydrocarbons, may also be prepared by liquid or vapor polymerization of olefins in the presence of suitable catalysts, such as boron fluoride, aluminum chloride, ferric chloride, and the like. In general, the Friedel-Crafts catalysts are used. Materials prepared as above may be used as suitable substitutes for linseed oil, tung oil, and the like, in drying oils, enamels, paints, varnishes, core oils, and preservative compositions generally. They may be used to extend, supplement, or add to compositions containing standard vegetable oils without losing any valuable properties of the latter. In some cases our improved materials may serve to improve the quality of compositions of this character because of their synergistic action. They may be used in resin type adhesives, in caulking compounds, factices, and other materials as indicated above. They appear to be useful in the manufacture of linoleum to which they impart tough, flexible properties comparable with those of linseed oil. For use in linoleum the carboxylated polymer may be used, in part at least, without esterification.

For some purposes it is desirable to incorporate in our improved composition suitable metallo-organic driers or modifiers, such as the lead or cobalt naphthenates and abietates. These may be employed in the composition to which our improved polymers are added as ingredients. If desired these modifiers may be mixed directly with the carboxylate polymer and copolymerized therewith to some extent.

It will be understood that other suitable ingredients may be added and/or substituted in our improved composition as understood by those skilled in the art, without departing from the spirit of this invention.

We claim:

1. A process of preparing synthetic drying oils which comprises condensing at a temperature above 100° C. a polyolefinic polymer having a molecular weight between 200 and 1000, obtained by the clay treatment of steam cracked gasolines with a compound selected from the group consisting of alpha,beta unsaturated carboxylic acids and alpha,beta unsaturated nitriles and then esterifying the product with an alcohol having from 2 to 20 carbon atoms in a straight chain at a temperature between 100 and 200° C.

2. A process of preparing synthetic drying oils which comprises condensing at a temperature above 100° C. a polyolefinic polymer having a molecular weight between 200 and 1000, obtained by the clay treatment of steam cracked gasolines with maleic anhydride and then esterifying the product with an alcohol having from 2 to 20 carbon atoms in a straight chain at a temperature between 100 and 200° C.

3. A process of preparing synthetic drying oils which comprises condensing at a temperature above 100° C. a polyolefinic polymer having a molecular weight between 200 and 1000, obtained by the clay treatment of steam cracked gasolines with a nitrile and then esterifying the product with an alcohol having from 2 to 20 carbon atoms in a straight chain at a temperature between 100 and 200° C.

4. A process of preparing synthetic drying oils which comprises condensing at a temperature above 100° C. a polyolefinic polymer having a molecular weight between 200 and 1000, obtained by the clay treatment of steam cracked gasolines with maleic acid and then esterifying the product with an alcohol having from 2 to 20 carbon atoms in a straight chain at a temperature between 100 and 200° C.

5. A process of preparing synthetic drying oils which comprises condensing at a temperature above 100° C. a polyolefinic polymer having a molecular weight between 200 and 1000, obtained by the clay treatment of steam cracked gasolines with maleic anhydride and then esterifying the product with glycerin at a temperature between 100 and 200° C.

6. A process of preparing synthetic drying oils which comprises condensing at a temperature above 100° C. a polyolefinic polymer having a molecular weight between 200 and 1000, obtained by the clay treatment of steam cracked gasolines with acrylo nitrile and then esterifying the product with glycerin at a temperature between 100 and 200° C.

7. A process of preparing synthetic drying oils which comprises condensing at a temperature above 100° C. a polyolefinic polymer having a molecular weight between 200 and 1000, obtained by the clay treatment of steam cracked gasolines with maleic acid and then esterifying the product with glycerin at a temperature between 100 and 200° C.

JOHN C. ZIMMER.
JEFFREY H. BARTLETT.

REFERENCES CITED

The following references are of record in the file of this patent:

UNITED STATES PATENTS

| Number | Name | Date |
| --- | --- | --- |
| 2,142,980 | Huijser et al. | Jan. 3, 1939 |
| 2,234,660 | Thomas | Mar. 11, 1940 |
| 2,240,006 | Peterson | Apr. 29, 1941 |
| 2,279,688 | Larsen | Apr. 14, 1942 |
| 2,380,699 | Kyrides | July 31, 1945 |